United States Patent [19]

Burke

[11] Patent Number: 4,665,558
[45] Date of Patent: May 12, 1987

[54] FLUID-OPERATED, LINEAR-ROTARY, ROBOT-LIKE, ACTUATOR

[76] Inventor: David W. Burke, 179 Ocean House Rd., Cape Elizabeth, Me. 04107

[21] Appl. No.: 687,294

[22] Filed: Dec. 28, 1984

[51] Int. Cl.$^4$ ............................................. B25J 11/00
[52] U.S. Cl. .......................................... 414/753; 92/2; 92/33; 92/110; 92/121; 92/166; 901/22
[58] Field of Search .................. 414/753, 749; 901/22, 901/37; 92/2, 33, 121, 110, 166

[56] References Cited

U.S. PATENT DOCUMENTS

| | | | |
|---|---|---|---|
| 3,773,189 | 11/1973 | Kitamura et al. | 901/22 X |
| 4,379,335 | 4/1983 | Kirsch et al. | 901/22 X |
| 4,508,015 | 4/1985 | Lin | 92/2 |
| 4,526,087 | 7/1985 | Agostine et al. | 92/2 X |

FOREIGN PATENT DOCUMENTS 393930  11/1965  Switzerland ........................ 92/121

Primary Examiner—Robert J. Spar
Assistant Examiner—Donald W. Underwood
Attorney, Agent, or Firm—LaForest S. Saulsbury

[57] ABSTRACT

This is a fluid-operated linear-rotary robot-like actuator reconstructed from a standard fluid cylinder device. The solid piston of the standard cylinder device is replaced with a self-contained vane-operated piston structure formed of spaced piston parts and an interposed vane chamber and in which a vane-operated work piston is rotated. The work piston extends through the forward cylinder head. A second piston rod extends from the rear part of the piston structure through the rear cylinder head and has passages for supplying the vane chamber of the piston with fluid under pressure. Suitable push button and microprocessor control systems, either by push button or automatically, are provided for controlling the operation of the actuator to give combined linear and rotary movement to a robot hand.

8 Claims, 10 Drawing Figures

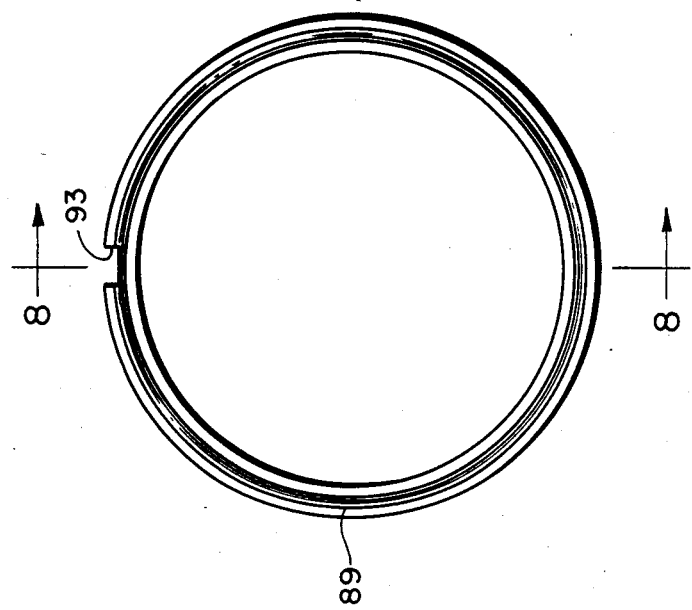
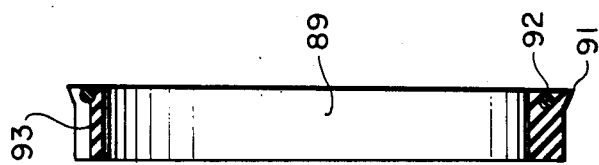

FLUID-OPERATED, LINEAR-ROTARY, ROBOT-LIKE, ACTUATOR

This invention relates to a fluid-operating, linear-rotary, robot-like actuator.

It is the principal object of the present invention to provide a fluid-operated linear-rotary robot-like actuator for use in heavy and rotational work operations with great torsional force in its rotary movement while not effecting its linear movement.

It is another object of the invention to provide a linear-rotary actuator by simple conversion of a standard linear fluid cylinder device by replacing the solid piston therein with a specially designed vaned piston structure independently supplied wtih fluid separately from the enclosing cylinder by way of a second piston rod extending from the rear of the actuator to which fluid hose couplings are attached and minimizing the number of special parts for the construction of a linear-rotary actuator and will only consume like space of the solid piston standard linear fluid cylinder device.

It is still another object of the invention to provide a fluid-operated, linear-rotary, robot-like actuator that can be controlled either by a manual push-button electro-hydraulic mechanism or automatically in continuous operation by a programmed microprocessing arrangement, the rotary movement of the work piston rod with its work tool head being effected during the forward and reverse stroke or separately at either end of the stroke with all movements being forceful, positive and without relaxation.

Further objectives of the invention are to provide a fluid-operated, linear-rotary, robot-like actuator, having the above objects in mind, which is of simple construction, has a minimum number of parts, easy to assemble, inexpensive to manufacture, rugged in construction, durable, of standard and interchangeable parts, and efficient in operation.

Upon a search for prior art, the closest patents which have been found, is the patent to Muszuynski U.S. Pat. No. 2,893,210, while showing vane means for rotating a linearly moveable member work rod does not show a moveable piston structure rotatable, carring a vaned piston rod and the patent to Molt U.S. Pat. No. 2,750,816 shows an air operated drill with a vane motor built into an air operated two-way piston, and unsuitable for robot-like controls and operations.

Generally, the present invention relates to a converted standard fluid-operated cylinder device in which the solid piston is replaced by a self-contained piston structure with a vane-rotated piston rod adapted for extension through its standard cylinder head assembly.

A self-contained vaned piston structure having a piston rod journalled therein and rotated by a vane in a vane chamber, will simply replace the solid piston and piston rod of a heavy duty standard fluid-operated cylinder device. The vane-operated piston will be supplied independently of the extended fluid cylinder through a second piston rod extending through the rear cylinder head and to which separate fluid hose lines are attached. The new assembly will consume little more space than the standard cylinder device and fit within the same location, ready to perform robot-like work. High torsional force as well as linear force will be available. A push button control and even a microprocessor control for automatic, continuous operation, have been provided for use with this vane piston cylinder device.

For a better understanding of the invention, reference may be had to the following description, taken in connection with the accompanying drawing, in which FIG. 1 is an elongated prespective view of the fluid-operated, linear-rotary, robot-like actuator taken with its push button electro-hydraulic control and mounted upon a test table and accessible to a fluid reservoir supply.

FIG. 2 is a longitudinal sectional view of the fluid-operated, linear and rotary actuator by itself in which the cylinder and piston structure are opened to show the rotary vane therein, the cylinder being double-acting and with piston rods extending from opposite ends thereof, one piston rod to perform linear and rotary work movement and the other piston rod delivering operating fluid to the piston vane chamber.

FIG. 7 is a side end view of one of the flared thrust piston seals with an O-ring in the flaring and showing the seal being slotted to receive the elongated key extending along the top inner face of the external cylinder.

FIG. 8 is a vertical sectional view of the flared thrust piston seal as taken on line 8—8 of FIG. 7.

Figure 1:
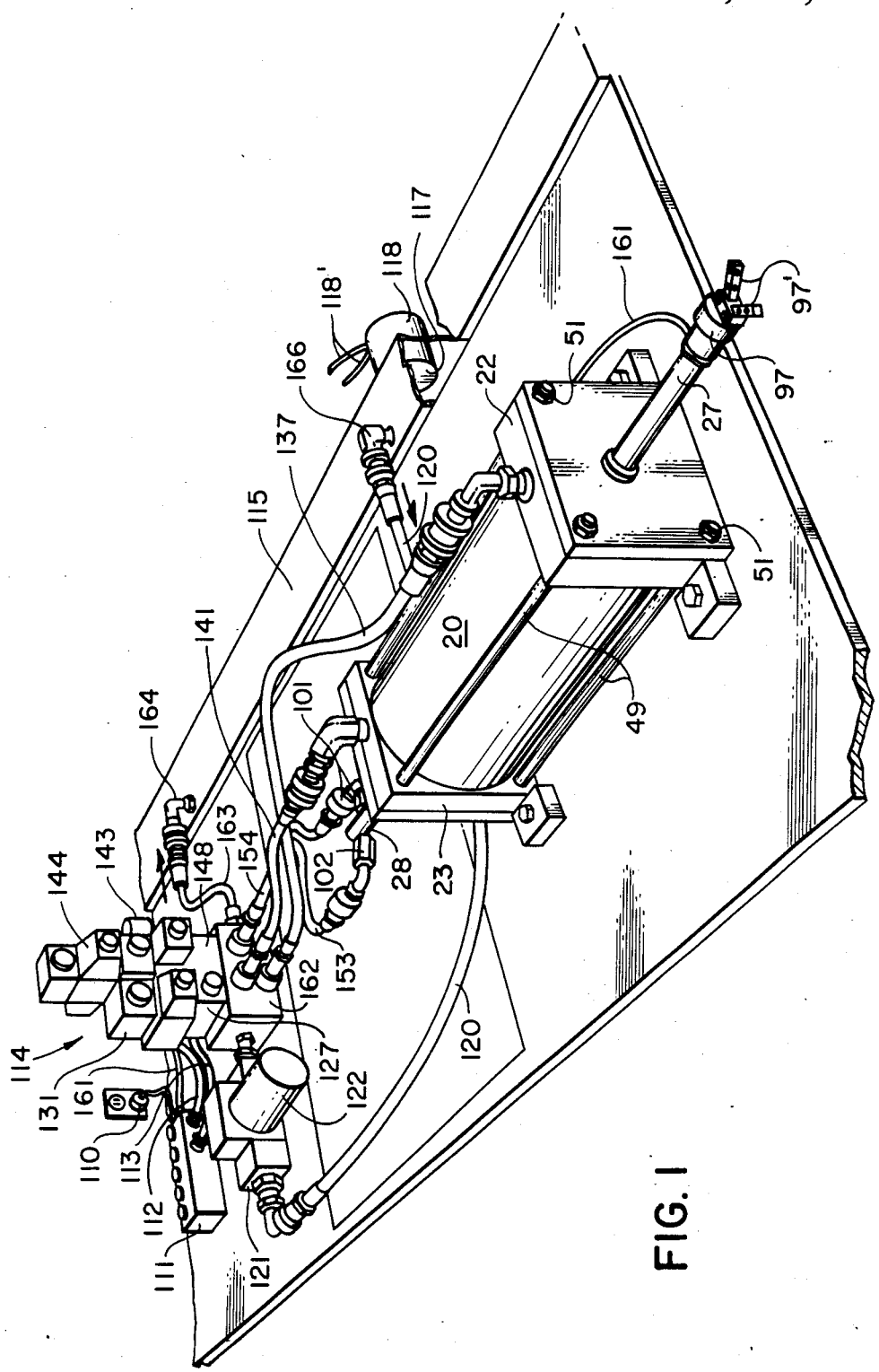
Figure 2:
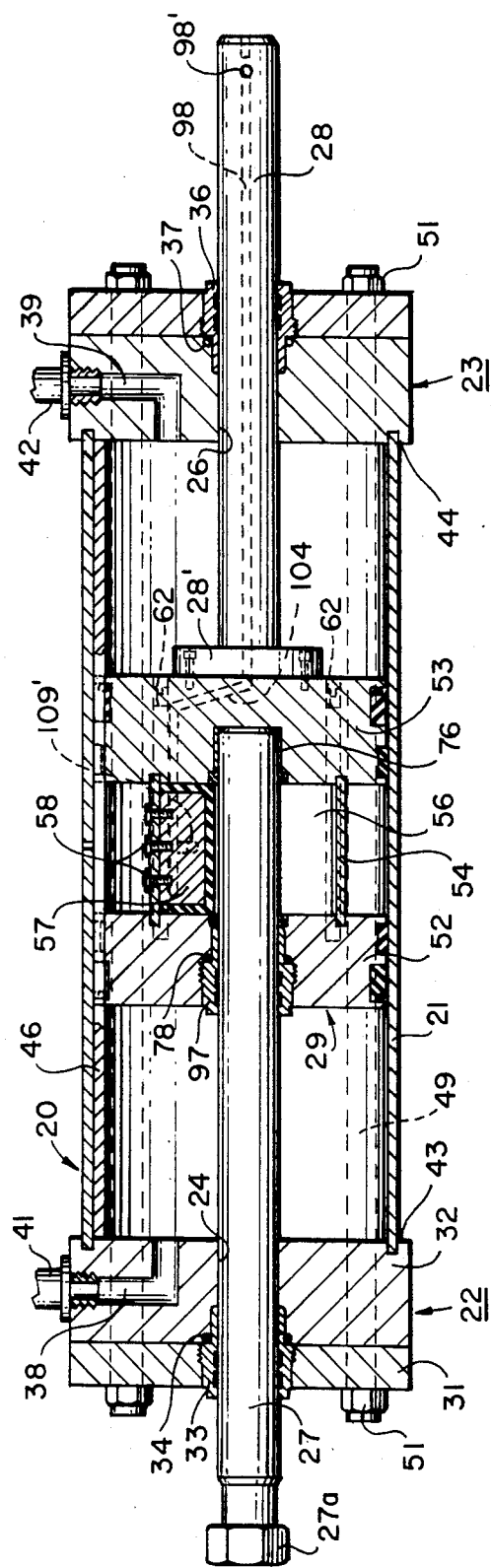
Figure 3:
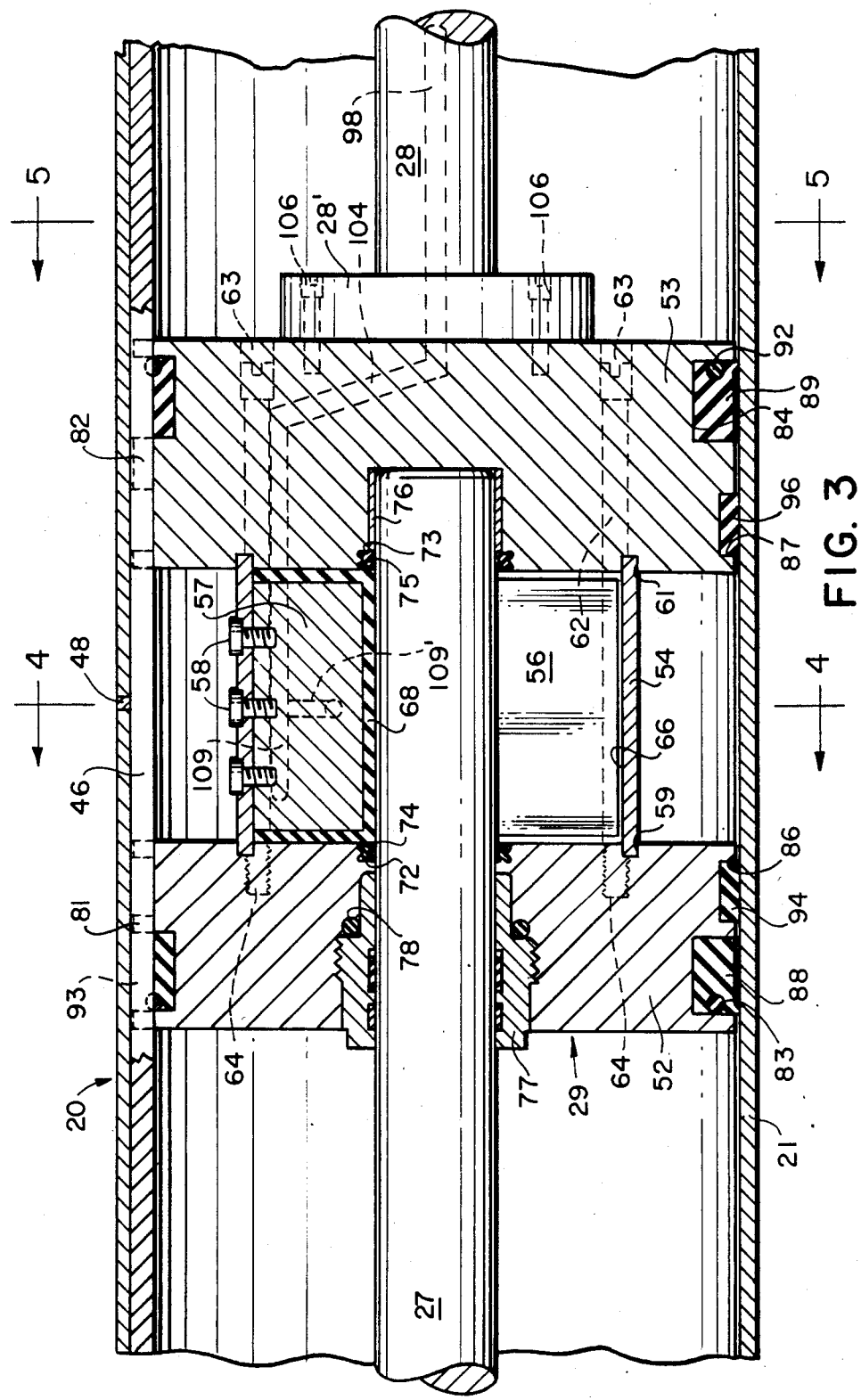
FIG. 3 is an enlarge fragmentary longitudineal sectioned view similar to FIG. 2.
Figure 5:
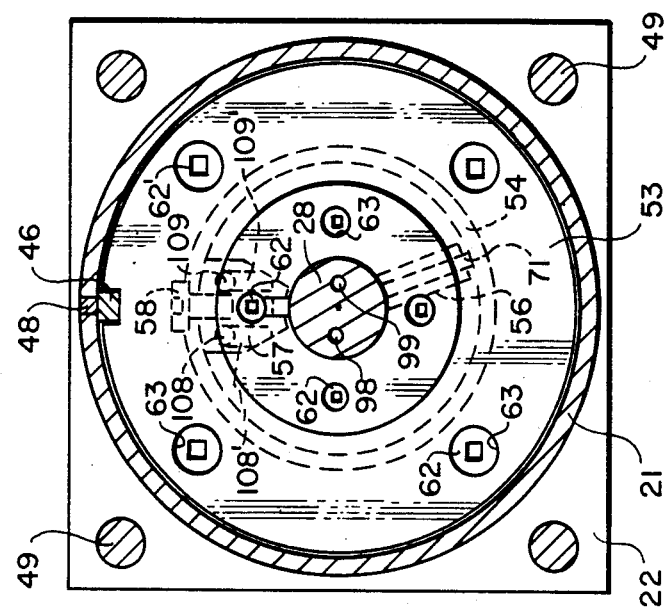
FIG. 5 is a transverse sectional view of the fluid-operated actuator taken on line 5—5 of FIG. 3 and looking upon fluid supply end of the piston structure and the flange of fluid supply piston rod connected thereto.
Figure 4:
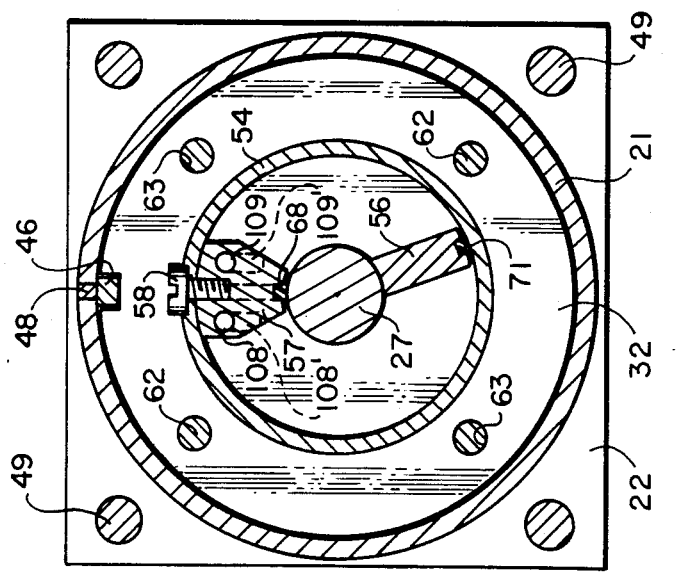
FIG. 4 is a transverse sectional view of the fluid-operated actuator taken on line 4—4 of FIG. 3, looking in section upon the piston cylinder, vane stop, vane and rotary piston.

Referring now to the structural views of FIGS. 1 through 8, inclusive, a description will be made to the fluid-operated actuator by itself and later a description will be made of the push-button and computerized control systems of respective FIGS. 9 and 10 and to FIG. 1 showing a pictoral view of the push-button control parts as used with the actuator to perform work by a robot hand.

Now with reference to FIGS. 1 through 8, the actuator is generally indicated at 20, 21 represents the standard fluid cylinder sleeve, closed at its ends respectively by forward and rear head assemblies 22 and 23 having respective central holes 24 and 26 and through which extended respectively work and fluid supply piston rods 27 and 28 from an internal piston structure indicated generally at 29 and linearly operable within the cylinder sleeve 21 of actuator 20. The forward head assembly 22 includes an outer plate 31 and an inner plate 32 in both of which the central hole 24 is enlarged to accomodate a self-contained combination wear bushing and seal unit 33 screw-fitted into plate 31 and pressed into thicker inner plate 32 against an external O-ring 34. The rear head assembly 23 is similarly constructed of two plates with its opening 26 enlarged to accomodate another similar self-contained combination wear bushing and seal unit 36 and similarly mounted with O-ring 37 in the opening 26 and between the plates of this rear head assembly 22 and through which the fluid supply piston rod 28 is linearly operated. The work piston rod 27 is both linearly and rotationally operated in the opening 24 and bushing and seal unit 33 of the forward head assembly 22. The supply piston rod 28 only linearly operated in the opening 26 and wear bushing and seal unit 36 of the rear head assembly 23.

The thicker plates of the head assemblies 22 and 23 are respectively provided with respective fluid passages 38 and 39 threaded respectively at their upper end for receiving respective threaded nipples 41 and 42 to which appropriate fittings of hose lines are coupled for the supply and exit of fluid to the opposite ends of the cylinder 21 and for the linear forward and return movement of the piston structure 29 and its work and fluid supply piston rods 27 and 28. The head asemblies are respectively provided with circular grooves 43 and 44 to accomodate the respective opposite circular ends of the cylinder-shaped sleeve 21 in fluid tight fitting engagement therewith.

Generally, a standard sleeve of any ordinary double piston rod fluid cylinder device, including its head assemblies that accomodate the piston rods, can be used except for its piston, with little alteration for use of the vaned piston structure 29, that, according to the invention, needs only to be retained as a unit against rotation within the cylinder and confined to lineal movement alone.

With the cylinder sleeve made free of a standard cylinder device and the piston thereof discarded, an elongated key 46 is installed to the top interior surface of the cylinder 21 and runs the length of the cylinder between the inner faces of the head assemblies. To affix this key 46, longitudinally aligned, a series of small holes 47 are drilled through the cylinder wall into which deposits of weld material 48 are poured for engagement with top edge of the key 46 to secure the key rigidly upon the inner surface of the cylinder 21 and therewithin, FIG. 6. The new vaned piston structure 29 is provided with keyway means to accomodate the key 46, the details of which will become apparent as the description proceeds. Once the new piston structure 29 and its piston rods 27 and 28 are placed in the cylinder 21 with its keyway in registration with the elongated key 46, and the cylinder heads 22 and 23 slid over the piston rods. This completed assembly is brought home over the ends of the cylinder 21, secured by the four long bolts 49 with threaded ends running exteriorly of the cylinder sleeve 21 and through the corners of the head assemblies 22 and 23 that are drawn onto the ends of the cylinder sleeve 21 by tightening nuts 51 over the threaded ends of the through bolts 49 and against the head assemblies 22 and 23.

Thus, the standard fluid cylinder device will have become converted into a robot-like actuator 20 with its work piston rod 27 capable of providing rotary movement as well as linear movement, and as will become later apparent, such movement may be had separately or simultaneously according to adjustments of the push button and computerized control systems diagrammatically shown in FIGS. 9 and 10 that may be used therewith and to be later described. The new rear piston rod 28 will serve for conducting actuating hydraulic fluid to and from the new internal vaned piston structure 29 and while in co-axial alignment with the work piston rod 27, it is merely fixed to the piston structure 29 for linear movement therewith, only the work piston rod 27 being rotatable in the vane piston structure 29 in a manner as will be described and made more apparent. While the rear piston rod 28 is not fashioned to perform work, it could have a work head for certain linear operations.

The vaned piston structure 29 generally comprises two piston parts 52 and 53, front and rear, secured to each other in spaced relationship and against a less diameter cylindrical piston sleeve 54 that houses the inner end of the work piston rod 27 with rigid vane 56 extending radially outwardly therefrom into wiping relationship with the interior surface of the piston sleeve 54 and a cooperating vane stop 57 secured to the upper interior of the piston sleeve 54 by a set of longitudinal aligned screws 58 extending through the sleeve wall and into threaded openings $58^1$ in the vane stop. The inner surfaces of the spaced piston parts 52 and 53 are respectively provided with circular recesses 59 and 61 into which the respective ends of the cylinder 54 are tightly seated. This piston structure 29, including the piston parts 52 and 53 and the piston sleeve 54, are held together against longitudinal and rotational displacement by four equally angularly spaced elongated threaded rod screws 62 lying outside of the piston sleeve 54 and passing through screw head receiving holes 63 in the rear piston sleeve 53 and into aligned threaded openings 64 in the front part 52. The screws 62 may be described as elongated Allen-type screws with driver insertable heads $62^1$ and threaded ends $62^{11}$, see FIG. 6. The circular recesses 59 and 62 in the respective piston parts 52 and 53 may be enlarged to receive O-rings (not shown) to ensure proper sealing of the vane chamber 66 with the piston structure 29.

The vane stop 57 circumferentially takes up some 45 degrees of the valve chamber 66 and has opposite side faces converging radially toward the piston rod 27 so that its opposite faces extend radially of the chamber 66 for blunt, flush engagement of the vane radial faces therewith upon the vane contacting the vane stop 57. The vane 56 is somewhat thick and consumes circumferential space and when closed in flush engagement with one of the inclined side faces of the vane stop leaves a circumferential space of some 280 degrees in wich the vane is worked. The inner edge of the vane stop is curved to conform to the surface of the work piston rod 27. A continuous groove 67 is cut radially down one side end of the vane stop, along its inner edge, and up the other side end and in which is wrapped a strip 68 of wiping material to prevent leakage of work fluid between the opposite sides of the vane stop 57. A similar continuous groove 69 is cut in the side ends of the vane 56 itself, radially outwardly, and along its outer edge so that a strip 71 of wiping material will wipe the ends of the fluid chamber 66 and the inner surface of cylinder sleeve 54 to limit the flow of fluid between the opposite sides of the vane 56 and all of this to ensure high torsional action of the work piston rod 27, see FIG. 6.

To prevent leakage of fluid from within the piston vane chamber 66 along the work piston rod 27 journalled in the vane piston structure 29, the inner faces of the piston parts 52 and 53 are respectively provided circular recesses 72 and 73 in which are respectively disposed so-called quadseal rings 74 and 75 that will tightly press upon the linear and rotating piston rod surface for sealing engagement therewith.

In the rear piston part 53 and inwardly of the circular recess 73 there is shrunk a bronze bushing 76 in which the inner end of the work piston rod 27 is journalled. In the front piston part 52 and surrounding the work piston rod 27, is a combined bushing and seal unit 77, similar to the header bushing and seal units 33 and 36, and threaded against an O-ring 78 within the piston part 52. These combined bushing and seal units 33 and 36 in the cylinder heads and the unit 77 are simply inserted with a spanner wrench, extended between opposing radial slots 79 in the end of the units, FIG. 6. It should now be apparent that the work piston rod 27 is wholly supported for rotation in the vaned piston structure 29 and through the forward cylinder head 22 and its bushing and seal unit 33 for linear movement as well as for rotation.

On the outer periphery of the front and rear piston parts 52 and 53 are respectively deep piston seal grooves 83 and 84 shallow piston wear ring grooves 86 and 87, the deep grooves being outwardly of the shallow grooves in the piston parts. The deep grooves 83 and 84 of the piston parts respectively receive flared piston seals 88 and 89 of a type, such as shown in FIGS. 7 and 8 of compressible material flared at 91 when free of the cylinder and piston and with an O-ring member 92 under the flaring 91. These piston seals 88 and 89 are slotted part way down as indicated at 93 to receive the elongated key 46 and is continuous under the slot in the groove for its full extent therearound. The flarings and O-rings in the seals 88 and 89 will lie on the outer side of the ring slots for most effective use for wiping and sealing engagement with the cylinder surface and piston groove.

The shallow grooves 86 and 87 contain respectively expansible and severed shallow fibrous piston wear rings 94 and 96 with separable ends of the slit ring fitted over the cylinder key 46 and expanded to engage the cylinder interior wall surface. Thus, this two part piston structure 29 with a vane and piston rod rotated therein, will have no leakage past the piston structure within the fluid cylinder anymore than a solid onepart piston would have.

Figure 6:
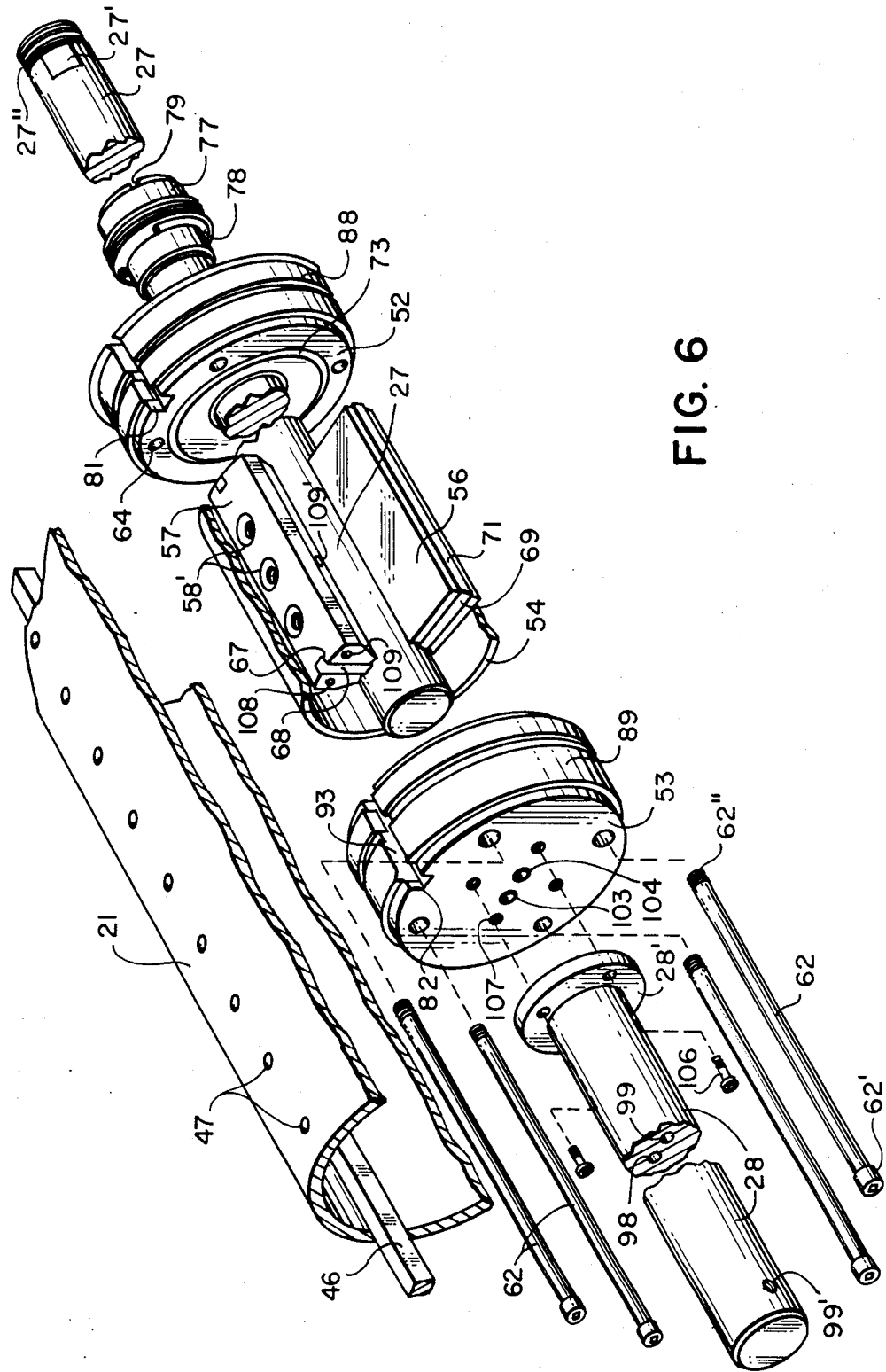
FIG. 6 is an exploded perspective view of vane piston structure including the spaced piston parts, the vane and its vane stop disposed between space piston parts and the two piston rods, and fragments of the extended cylinder sleeve with its installed elongated key, and looking forward from the supply piston rod towards the linear-rotary work piston rod.

The forward work end of the work piston rod 27 has flat face 27¹ on opposite sides thereof to hold the piston rod 27 by a clamp tool against rotation while fitting a work head tool, such as a robot hand 97, on its threaded end 27¹¹, see FIG. 1 and 6.

The rear supply piston rod 28 has only linear movement since it is merely attached to the piston structure 29 and could be arranged for mere linear working operations but is principally used for the supply and return of fluid to the vane chamber 66 of the piston structure 29. The piston rods 27 and 28 could be a consolidated through piston rod running entirely through the piston structure 29 and operable by the solitary vane secured thereto. The solitary piston rod would have the passages for delivering fluid to the opposite side of the vane within the vane chamber 66. This would be possible since in the present arrangement is not such that rotation would entangle hoses connected thereto.

The rear linearly-operated, fluid-supply, piston rod 28 has parallel passages 98 and 99 that respectively start from cross entrances 98 and 99 near the projected rear end of the piston rod 28 where fhey are respectively supplied with fluid from laterally opposite side fittings 101 and 102, FIG. 1, that run through inner flange end 28¹ of the piston rod 28 and match respectively with respective passages 103 and 104 of the rear piston part 53, see FIG. 6, upon the flanged rod end 28¹ being made secure to the piston part 53 by four screws 106 from the flanges entering threaded holes 107 of the piston part 53. The passages 103 and 104 extend radially and forwardly through the piston part 53 for communication respectively with respective passages 108 and 109 of the vane stop 57 and outward through opposite faces of the vane stop 57 at 108¹ and 109¹ to the vane chamber 66. With alternate delivery of the fluid under pressure to vane chamber 66 through these passages will cause torsional rotation of the vane 5 and rod 27 in one direction or the other.

Figure 9:
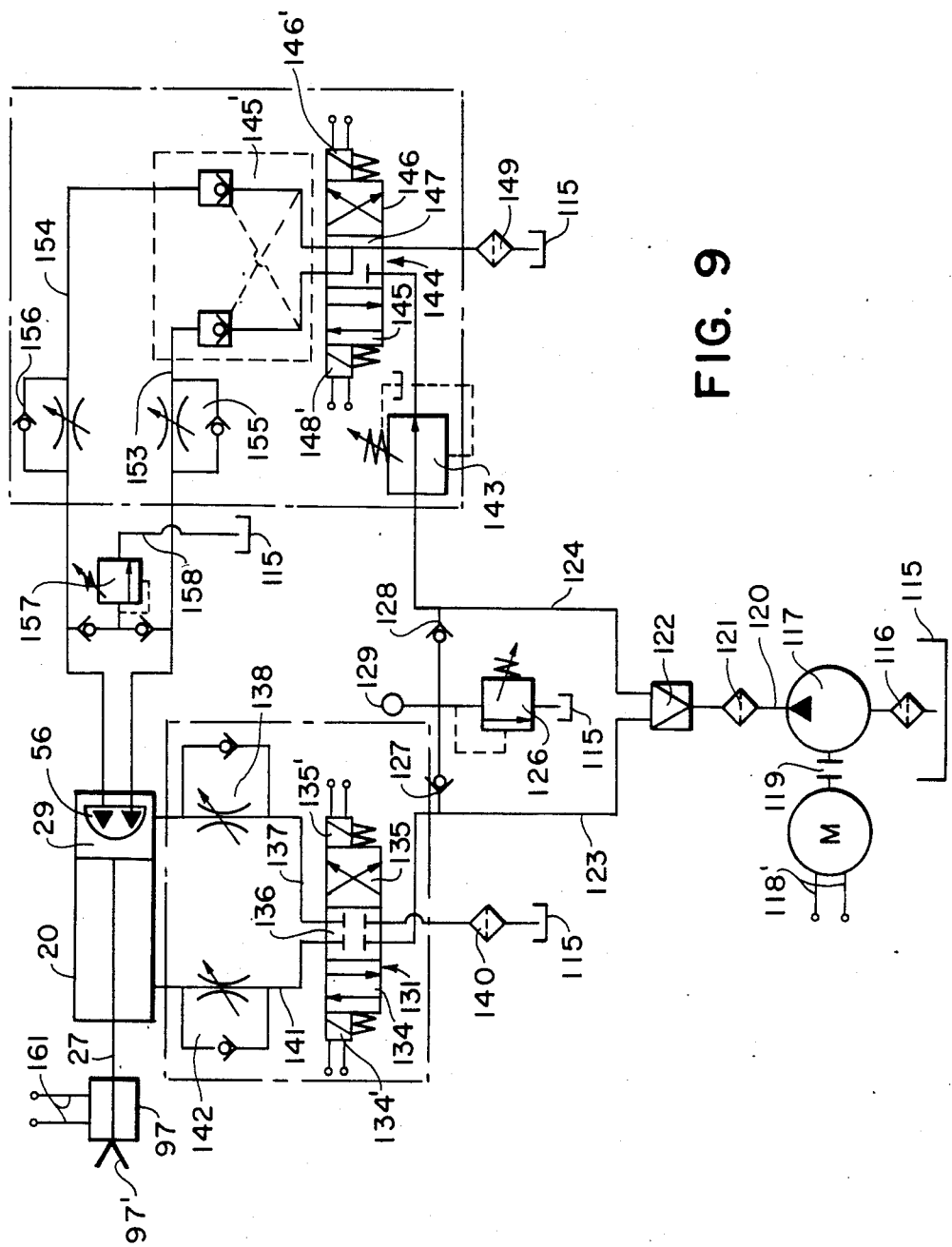
FIG. 9 is a diagrammatic view of the push-button electrohydraulic control system used in the operation of the actuator and as applied in the perspective showing of FIG. 1, the several component valve parts making up the valve bank.

In FIGS. 1 and 9, the push button electro-hydraulic control mechanism for governing the operation of the actuator is shown. With this control mechanism, the forward and retracting movements of the work piston rod 27 as well as the rotational movements thereof will all be controlled independently by any one of the push buttons of an elongated switch block 111 of FIG. 1. The diagram of FIG. 9 is primarily that of the various hydraulic valve mechanisms, many of which have drain return to the fluid reservoir 115. These hydrauilc valve mechanisms are solenoid-operated with free wires as shown extending from the solenoids of these mechanisms and having an electric power source 110, FIG. 1, of a wall and the wiring inluding the push button switches of the switch block 111 supply actuating current through cables 112 and 113 of FIG. 1 to the valve bank indicated generally at 114 of the several hydraulic valve control mechanisms that will be mentioned in the description of the diagram of FIG. 9 and each of which show their adjusting knob that need not be numbered as they are typically provided with these respetive valve mechanisms.

In FIG. 9, 115 represents the fluid reservoir that can be at any location as shown in FIG. 1 as along the rear of a table and in which will be a suction filter 116. A hydraulic pump 117 operated by an external electric motor 118, with wires 118¹ extending therefrom, the motor being coupled through a flexible coupling 119 to hydraulic pump 117. A hose connection 120, FIG. 1, delivers the fluid under pressure to a pressure filter 121 and a proportional flow divider 122 that divides the fluid and distributes it to two flow lines 123 and 124 that are protected by a relief valve 126 that drains to reservoir 115 and isolated by a relief valve 127 and 128 and pressure gauge 129 indicating relief valve pressure. The line 123 runs to a three-position, four-way, double-solenoid, spring-centered, directional control valve mechanism 131 which is used for the control of the linear movements of the actuator 20. The control valve mechanism 131 consists of a block 134 that retracts the work piston rod 27 of actuator 20 where as a block 135 controls the forward motion of the work piston rod 27. These blocks 134 and 135 are respectively operated by spring center solenoids 134¹ and 135¹ from which wires extend, and can be locked in may position by the central block 136. A line 137 passes from the block 136 to a flow control valve 138 and then to the rear of the actuator 20 to move the piston structure 29 and rod 27 forwardly. A line 141 passes through a flow control valve 142 and then to the forward end of the actuator to retract the piston structure 29 and rod 27. The central block 136 and mechanism 131 drains through filter 140 to fluid reservoir 115.

The flow line 124 delivers fluid to to a pressure reducing valve 143 to another three-position, four-way, double-solenoid, spring centered, direcitonal control valve mechanism 144 which control the operation of the vane 56 within the piston structure that gives rotation to the work piston rod 27. A valve block 145 of this mechanism 144 serves to control clockwise rotation to the vane 56 and work piston rod 27 while the opposite valve block 146 will control the counter-clockwise rotation of the vane 56 and work piston rod 27. The valve blocks 145 and 146 are respectively controlled by solenoids 145[1] and 146[1] from the control wires extending therefrom. A central valve block 147 of the control mechanism 144 and shown in locked position, is connected for the passing of fluid to pilot-operated cross check valve arrangement 148 to lock the vane on the piston 29 in any position of its rotational movement with valve of the central block 147 being locked as indicated. The rotary control mechanism 144 and check valve arrangement 148 are drained through filter 149 to fluid reservoir 115. In lines 153 and 154 that run from the opposite sides of check valve arrangement 148 are respectively flow regulating valves 155 and 156 and then lines 153 and 154 extend to the piston structure 29 of the actuator 20. Between these lines prior to the entry to actuator, is a braking relief valve 157 with associated check valves, that ensures the securement of the piston vane in any angular position. This braking valve is drained to reservoir 115 by a line 158. It should be apparent that the wires of the respective linear and rotary control mechanisms 131 and 144 will be connected into the push button control box 111 through cables 112 running thereto, FIG. 1. The push buttons of the control box 111 upon being depressed one at at time cause respectively forward and retracting movements of the actuator rod 27 and right an left rotation movements of the rod 27 by vane of the piston structure 29. The robot hand 97 will be closed by a fifth push button on the box 111. A wire cable of wires 161 runs from the box 111 to the robot hand 97 to close its fingers 97[1] when the fifth button is depressed.

Certain valve mechanisms of the diagram of FIG. 9 are shown bodily in the so-called valve bank 114 of FIG. 1 in which they are stacked one above another. At the bottom of the valve bank 114 is a base housing 162 from which extend all of the hose lines that connect to the actuator 20, that is, two linear hose lines 137 and 141, and the two rotary hose lines 153 and 154. The collected return fluid is delivered from the base housing 162 through hose 163 and elbow fitting 164 to the elongated fluid reservoir 115. A similar fitting 166 is provided forwardly thereto at the opposite end of the reservoir 115 for the connection of the pressure line hose 120 to filter 121, flow divider 122 and base housing 162.

Figure 10:
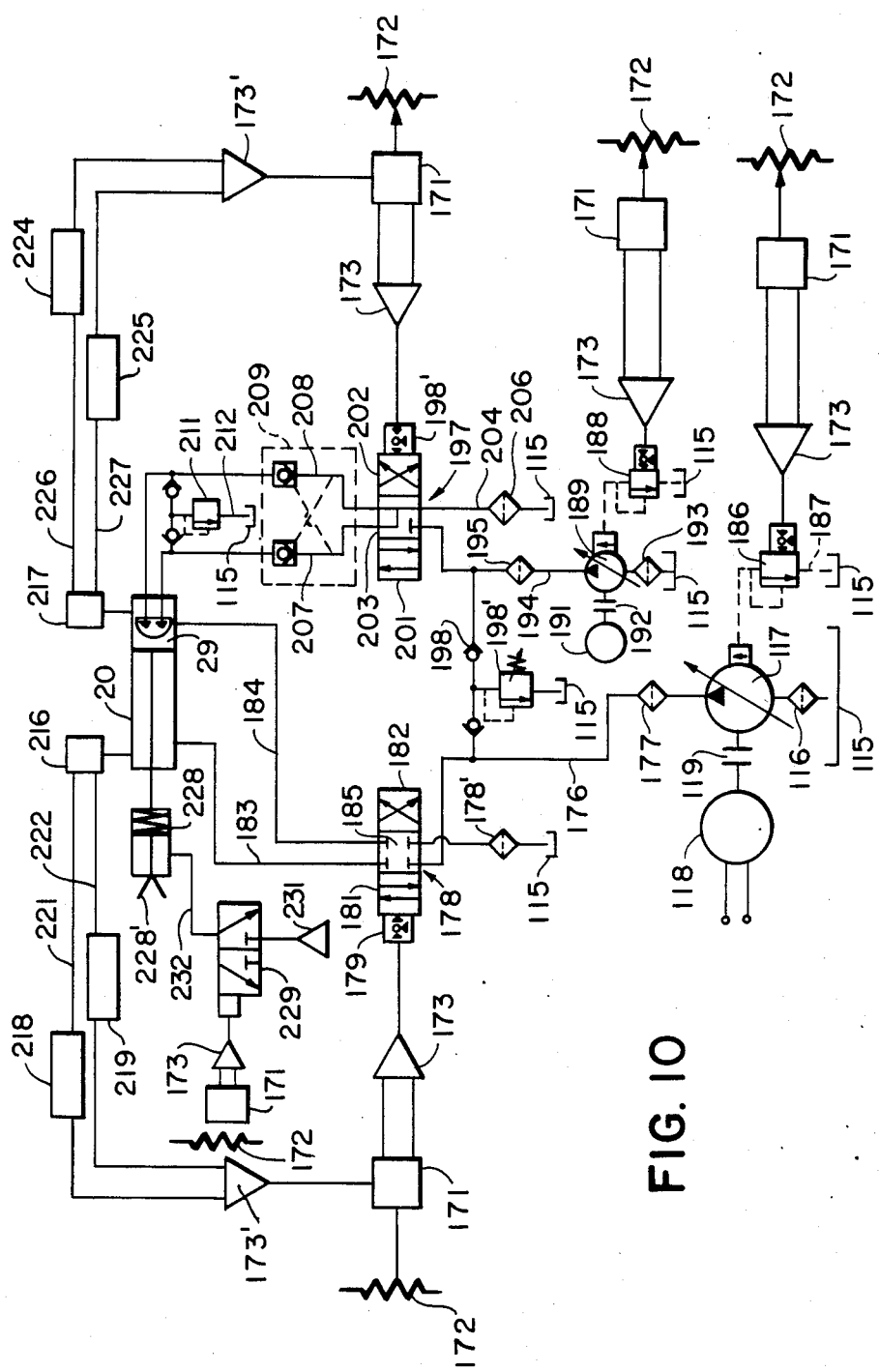
FIG. 10 is a diagrammatic view of a computerized microprocessor control system for effecting the continuous automatic operation of the actuator work piston rod and robot hand thereon in scheduled linear and rotary movements separately or together.

It should be apparent the operation of the present fluid actuator may be made automatically continuous by a computer or microprocssor arrangement, such as diagrammed in FIG. 10. Of course, the valve mechanisms will be generally the same as used in the push button control of FIG. 9 already described, but in lieu of the manual switch button of box 111 of FIG. 9, the operation of the valve mechanisms is controlled by input command computer elements 171 each powered from an electric source indicated at 172. Power amplifiers 173 take signals derived from the input command computer elements 171 to effect the sequence and timed operation of the valve mechanisms.

Starting with the reservoir 115 in FIG. 10 passing suction filter 116 and hydraulic pump 117 operated by an electric motor 118 through flexible coupling 119, all shown in FIGS. 1 and 9, and pressure line 176 runs through a pressure filter 177 to deliver fluid under pressure to a servo-controlled linear directional control valve mechanism 178 with a servo operator 179 and valve blocks 181 and 182 that respectively control the retraction and forward movement of the piston structure 29 and rod 27 of the actuator 20 through respective lines 183 and 184 leading from a central block 185 of the linear control mechanism 178. This mechanism 178 is drained through filter 178[1] to fluid reservoir 115.

The lower right-hand computer element 171 and its amplifier 173 serves a servo-controlled relief valve 186 to control compensator pressure at source pump 117 and return fluid through line 187 to reservoir 115. The intermediate computer element 171 just above the first mentioned one and its amplifier 173 serves another servo-controlled relief valve 188 to compensate pressure at another pressure source pump 189 operated by electric motor 191 through a flexible coupling 192. This pump 189, like the pump 117, takes fluid from reservoir 115 and through a suction filter 193. From this pump 189, fluid is forced through line 194 and pressure filter 195 to servo-controlled directional control valve mechanism 197.

Between pump pressure lines 176 and 194 is a double check valve line 198 to which is connected a relief valve 198[1] that drains to reservoir 115. The servo-controlled valve mechanism 197 is thus served by the upper right computer element 171 and its amplifier 173 with connection to its servo-operator 197[1] thereof and consists of valve blocks 201, 202 and a central line block 203 with a return line 204 and filter 206 to supply reservoir 115. From the central block 203 there extends two fluid lines 207 and 208 that lead through a cross check valve arrangement 209 to the vaned piston 29. Fluid delivered through line 207 gives rotation to the work piston rod 27 in a clockwise direction while through the other line 208 gives rotation in the counter-clockwise direction. These lines to the vaned piston 29 are thus bridged first by the cross check valve arrangement 209 and secondly by a braking relief valve 211 that drains through return line 212 to fluid reservoir 115.

To control the speed of linear operation of the actuator piston and of the rotational operation thereof in response to one another by sensing the position and velocity with a linear variable differential transducer sensor 216 having a digital linear supply output connected to forward end of the actuator 20 and a digital rotary output 217 connected to the rear of the actuator 20 operable in a Hall effect manner as with longitudinal grooves cut in the piston rod to supply outputs for the rotary position through velocity measurements. The linear digital output of the sensor 216 is converted to analog signals by digital-analog convertors 218 and 219 in the respective position and velocity lines 221 and 222 that lead to signal amplifier 173[1] of left volume feedback computer element 171 that is used with the linear directional control mechanism 179.

The digital rotary output Hall effect sensor 217 is converted to analog signals by digital-analog convertors 224 and 225 in respective position and velocity lines 226 and 227 that lead to signal amplifier 173[1] of upper right volume feedback computer element 171, rotary directional control mechanism 197. The analog signals are received by the microprocessor and compared to its program, and if pressure needs to be unloaded and decreased or increased, a command voltage signal is sent to the servo-pressure compensating relief valves 186 and 188 of the respective pumps 117 and 189 and if the flow needs to be decreased, increased or stopped, a command voltage signal is sent to the directional control valve mechanism 197 that may need adjustment. The microprocessors are continually receiving a feedback from the pressure and flow circuits and comparing them to the position and velocity outputs of the actuator, thus allowing the actuator 20 to be precisely controlled by the microprocessor to render them compatible for robot system.

The closing of the opposing fingers 97$^1$ of the robot hand 97 FIG. 10 is effected by a solenoid valve 229. By removal of a tool retaining nut 27a on the working piston rod 27 FIG. 2, the robot hand 92 can be threaded upon threaded end 27 and locked in any suitable manner against rotation.

With the microprocessor system of FIG. 10, an air-operated robot hand 228 with fingers 228$^1$ is used. A further input command element 171, through its amplifier 173, will control air valve mechanism 229 that delivers air pressure from an air source 231 through an air line 232 to air-operated robot hand 228 with a return spring biased to keep fingers 228 open. The closing of the fingers will be controlled by the programmed microprocessor system.

It should be apparent that a standard two-way, fluid-operated, cylinder device, has, by the present unique design, may be converted into a linear-rotary, robot-like actuator, consuming similar space and offering great linear and torsional force suitable for various high power robot and sequential uses of linear and rotational motions and particularly easy to be controlled anually and even by a microprocessor system.

While detail changes may be made in detail construction of the actuator and in the arrangement of the hydraulic mechanisms within the control systems, it shall be understood that such changes will within the spirit and scope of the invention as defined by the appended claims.

What is claimed is:

1. A fluid-operated, linear-rotary, robot-like actuator formed from a standard cylindrical sleeve part for a regular linear fluid actuator by replacement of its piston part for its conversion into the linear-rotary, robot-like actuator with a longitudinally-extending key strip secured to the internal surface of the cylindrical sleeve part and extending from one end thereof to the other, a chambered piston assembly operable within the sleeve part and having a keyway for receiving the key strip to restrain the assembly against rotation while permitting longitudinal linear movement thereof throughout the full length of the standard cylindrical sleeve part, forward and rear cylinder heads respectively secured to the respective opposite ends of the cylindrical sleeve part, each of said cylinder heads having a central slide opening therethrough and fluid openings for the supply of actuating fluid to the sleeve part to move the piston assembly and for the return of the fluid to its source, said chambered piston assembly being formed of separate parts comprising a central chamber sleeve, front and rear piston parts respectively overlying respective opposite ends of the chamber sleeve in fluid sealing engagement therewith and screw means external of the chamber sleeve for releasably securing the chamber sleeve and piston parts together outside of the sleeve part and against axial displacement from one another, said front piston part having a central opening therethrough and a sleeve bushing lying in sealed engagement within the front piston part central opening, said rear piston part having a central journal opening in its inner face and axially- aligned with the central opening of the front piston part, and a piston rod journaled in the opening of the rear piston part and extending through the bushing of the front piston part and through the opening of the forward cylinder head of the outer cylinder sleeve for independent rotational movement in the piston assembly and for linear and rotational movements within the forward cylinder head, a vane stop member extending radially inwardly from the interior surface of the central chamber sleeve to the piston rod, means for releasably securing the vane stop member to said sleeve part, a vane extending radially outwardly from the piston rod within the assembled piston chamber for cooperation with the vane stop member of the chamber sleeve and a further piston rod releasably secured to the rear face of the rear piston part slidable through the rear cylinder head, and passageway means within the further piston rod and the other piston parts for the supply fluid under pressure and return of the fluid to the opposite sides of the vane stop to rotate the vaned forward piston rod within the piston assembly and tie rod means for securing the outer cylinder sleeve and the cylinder heads together, whereby robot-like linear and rotational work movements may be performed by the forward piston rod.

2. A fluid-operated, linear-rotary, robot-like acturator as defined in claim 1 and sealing means for the vane stop member extending across the inner edge and side ends thereof for wiping engagement with the piston rod and sealing engagement with the inner faces of the front and rear piston parts and sealing means for the vane extending across its outer edge and about the side ends thereof for wiping engagement with the inner surface of the central sleeve and the inner faces of the piston parts.

3. A fluid-operated, linear-rotary, robot-like actuator as defined in claim 2 and ring-like piston seals carried on the piston parts for wiping and sealing engagement with the inner face of the cylindrical sleeve part, said piston seals being slotted to accomodate the key strip of the cylindrical sleeve part and wear rings in the piston part split to extend from opposite sides of the key strip.

4. A fluid-operated, linear-rotary, robot-like actuator as defined in claim 1 and fluid control means adapted for separate control of the linear movements of the vaned piston and piston rod from within the cylindrical sleeve part and of rotary movement of the vaned piston assembly rod rotatable within the piston assembly.

5. A fluid-operated, linear-rotary, robot-like actuator as defined in claim 4 and said fluid control means including valve mechanisms having solenoids and push button means for selectively actuating the solenoids and valve mechanisms.

6. A fluid-operated, linear-rotary, robot-like actuator as defined in claim 5 and solenoid-operated robot hand on the work end of the piston rod and push button means for operating the robot hand.

7. A fluid-operated, linear-rotary, robot-like actuator as defined in claim 4 and said fluid-control means including valve mechanisms with servo-operators and computerized microprocessor means for automatically actuating in continuous sequence the servo-operators and valve mechanisms.

8. A fluid-operated, linear-rotary, robot-like actuator as defined in claim 7 and a fluid actuated robot hand on the work end of the piston rod and said automatic computer microprocessor means including control for automatic operation in continuous sequence with the valve mechanism.

* * * * *